United States Patent
Crane

(10) Patent No.: US 9,427,904 B2
(45) Date of Patent: Aug. 30, 2016

(54) FITTING FOR VACUUM ASSISTED RESIN TRANSFER MOLDING

(71) Applicant: Xerojex LLC, Stanwood, WA (US)

(72) Inventor: Stephen Crane, Camano Island, WA (US)

(73) Assignee: Xerojex LLC, Stanwood, WA (US)

( * ) Notice: Subject to any disclaimer, the term of this patent is extended or adjusted under 35 U.S.C. 154(b) by 525 days.

(21) Appl. No.: 13/959,214

(22) Filed: Aug. 5, 2013

(65) Prior Publication Data
US 2014/0035275 A1 Feb. 6, 2014

Related U.S. Application Data

(60) Provisional application No. 61/680,080, filed on Aug. 6, 2012.

(51) Int. Cl.
B29C 70/54 (2006.01)
B29C 45/17 (2006.01)
B29C 70/44 (2006.01)

(52) U.S. Cl.
CPC ......... B29C 45/1775 (2013.01); B29C 70/443 (2013.01); B29C 70/54 (2013.01); *Y10T 29/49963* (2015.01)

(58) Field of Classification Search
CPC ............. F16L 5/06; F16L 5/10; F16L 41/04; B29C 70/443; B29C 70/54
USPC ................................ 285/139.1, 139.2, 139.3
See application file for complete search history.

(56) References Cited

U.S. PATENT DOCUMENTS

| | | | | |
|---|---|---|---|---|
| 3,181,899 A | * | 5/1965 | McKnight, Jr. | F16L 41/14 285/139.2 |
| 3,190,332 A | * | 6/1965 | Bernard | B65D 25/42 220/304 |
| 3,195,932 A | * | 7/1965 | Morton | F16L 41/14 220/DIG. 4 |
| 3,749,424 A | * | 7/1973 | Greene | F16L 41/14 285/139.1 |
| 4,561,134 A | * | 12/1985 | Mathews | E04H 4/12 4/496 |
| 4,773,871 A | * | 9/1988 | Behning | H01R 13/53 439/181 |
| 4,852,916 A | * | 8/1989 | Johnson | F16L 41/14 285/187 |
| 4,858,966 A | * | 8/1989 | Ciriscioli | F16L 33/00 285/200 |
| 5,046,762 A | * | 9/1991 | Konishi | F16L 5/06 285/200 |
| 5,755,425 A | * | 5/1998 | Marolda | F16L 41/14 251/144 |
| 6,840,750 B2 | | 1/2005 | Thrash et al. | |
| 7,909,366 B1 | * | 3/2011 | Hall | F16L 5/06 285/148.28 |
| 2003/0127853 A1 | * | 7/2003 | Haymon | F16L 41/14 285/139.1 |

* cited by examiner

*Primary Examiner* — David E Bochna
(74) *Attorney, Agent, or Firm* — SoCal IP Law Group LLP; Jonathan Pearce

(57) ABSTRACT

A fitting for vacuum assisted resin transfer molding and an associated method of use. The fitting includes a base, a sealing washer, a sealing nut, and an inner nut. The fitting is adapted such that it may be reused many times without failing and without causing damage to the fitting, the mold or any resulting hardened resin.

20 Claims, 6 Drawing Sheets

FITTING FOR VACUUM ASSISTED RESIN TRANSFER MOLDING

RELATED APPLICATION INFORMATION

This patent claims priority from the provisional patent application No. 61/680,080 filed Aug. 6, 2012 and entitled "VARTM Fitting."

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to vacuum assisted resin transfer molding.

2. Description of the Related Art

Vacuum Assisted Resin Transfer Molding (VARTM) is a method of manufacturing composite parts involving resin infusion. Fabrics are placed onto a rigid mold of a part and a vacuum bag is place around the mold. Liquid resin is injected into the cavity between the mold and the vacuum bag, which is under vacuum. If the vacuum is broken, the infusion process fails. Therefore, any seals interfacing with the vacuum bag must function perfectly. The resin is then absorbed into the fabrics, forming a laminate. Because of the vacuum in the cavity, the outer atmospheric pressure compresses the fiber tight against the rigid mold surface and helps the resin to flow to every part of the mold. Internal feed lines also may be included within the vacuum bag to aid in channeling resin throughout the interior of the mold.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
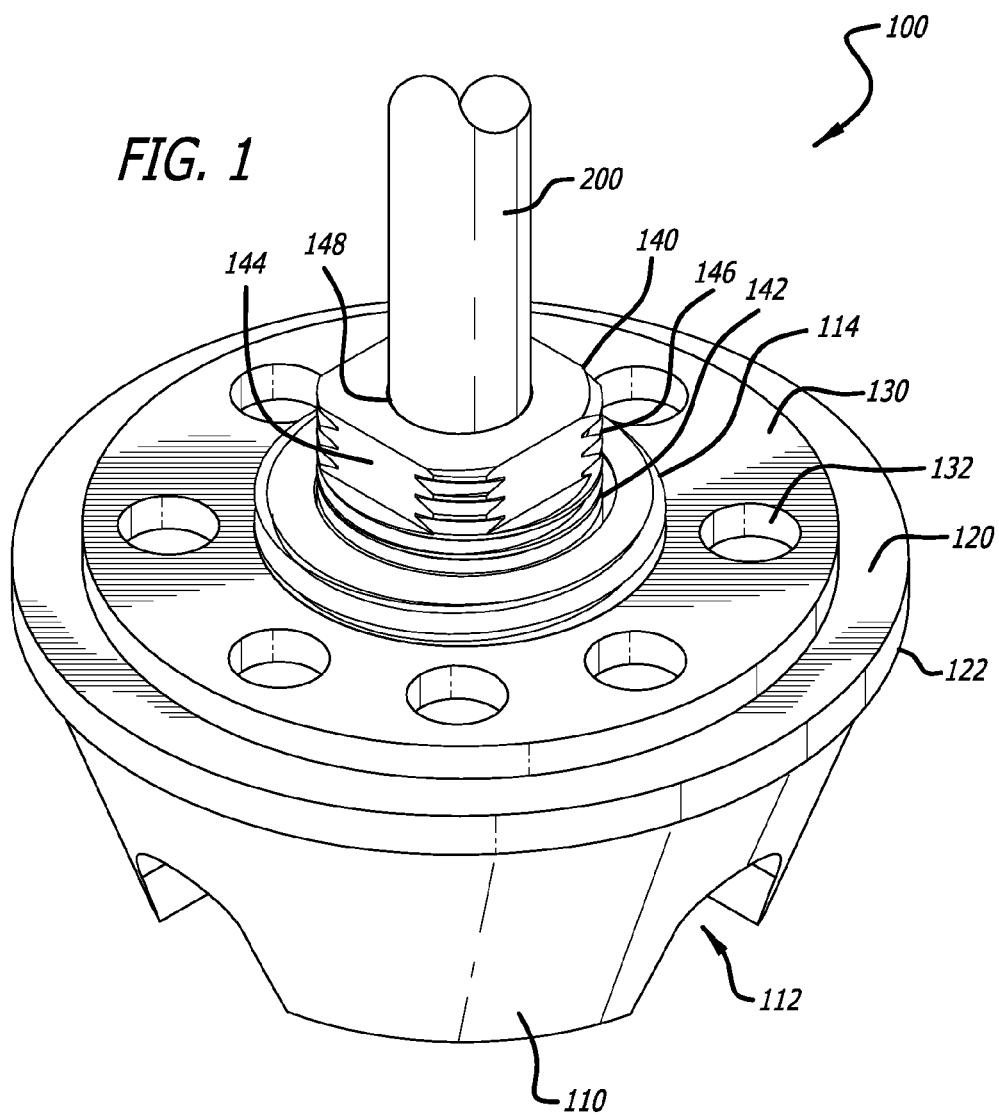
FIG. 1 is a perspective view of a fitting for vacuum assisted resin transfer molding.

Referring now to FIG. 1, a perspective view of a fitting 100 for vacuum assisted resin transfer molding is shown. The fitting 100 includes a base 110, a sealing washer 120, a sealing nut 130, and an inner nut 140. Tubing 200 for resin injection may be inserted through an aperture in the top of the inner nut 140 and pass substantially through the base 110. Although not shown in FIG. 1, the fitting 100 will occupy a pre-formed hole (a "port") in a vacuum bag, which will be held between the base 110 and sealing washer 120. Furthermore, a separate seal will be provided around the resin injection tubing 200. As will be clear below, these seals do not require tapes or elastomers, but instead utilize O-ring seals which may be replaced over time to maintain the fitting 100.

Figure 2:
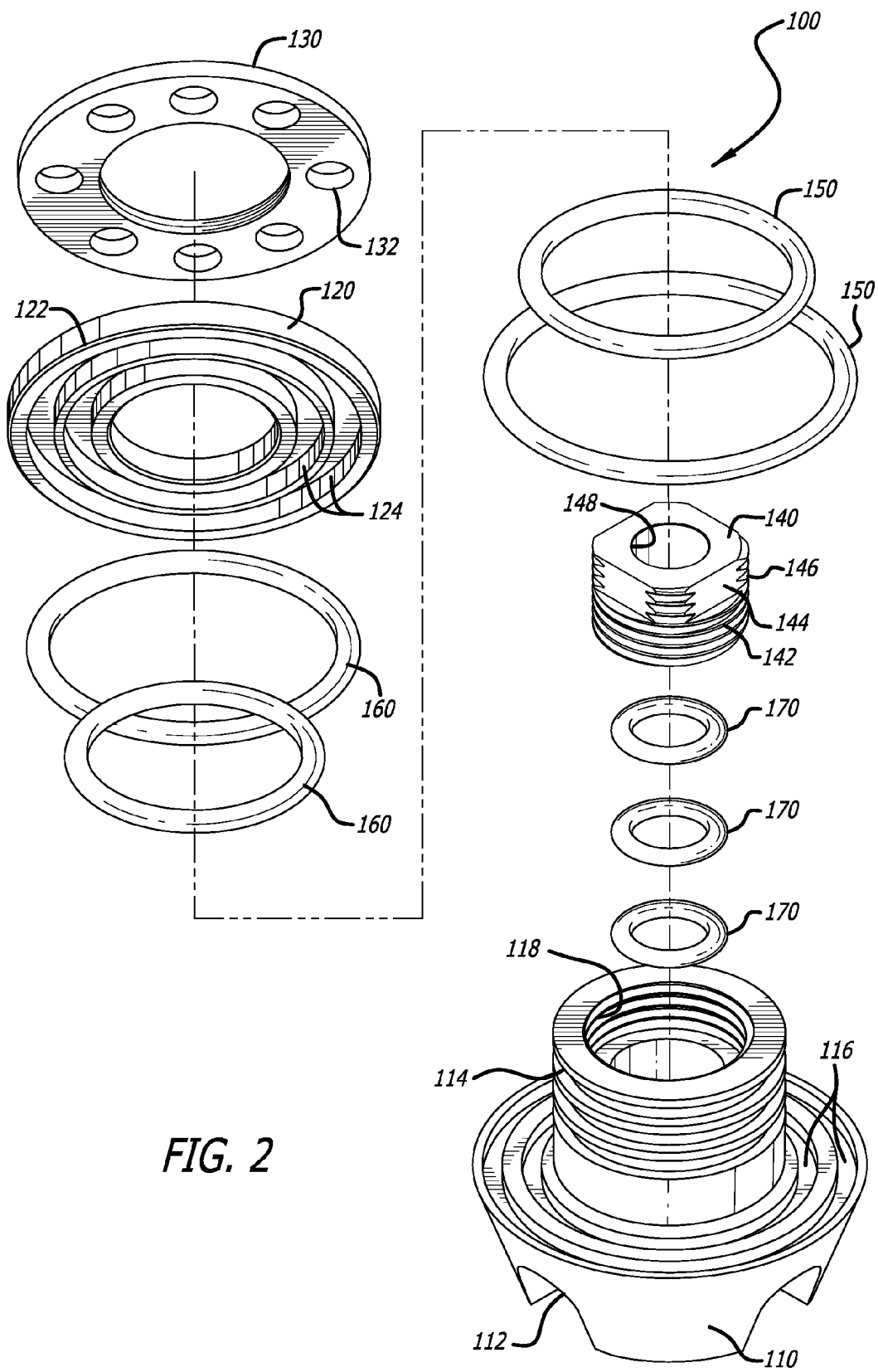
FIG. 2 is an exploded view of a fitting for vacuum assisted resin transfer molding.

With reference also to the exploded view of FIG. 2, the base 110 includes one or more saddles opening downward, such as saddle 112. Each saddle 112 is designed so that the base may be used over a feed line, such as a coiled or slotted hose. The base 110 may be placed over one or more feed lines that meet at the base 110. The base 110 also includes an upper portion with both a threaded exterior 114 to engage the sealing nut and a threaded interior 118 to engage the inner nut 140. This threading may be in opposition to one another (opposite direction) so that turning the inner nut 140 which engages the threaded interior does not alter the tightness of the sealing washer on the threaded exterior 114.

The base 110 is designed to sit inside of a port in a vacuum assisted resin transfer molding bag or other form and to provide a conduit by which resin is introduced into the bag or other form. The base 110 includes one or more base seals 150 (shown in FIG. 2) to create a seal in that port.

Figure 3:
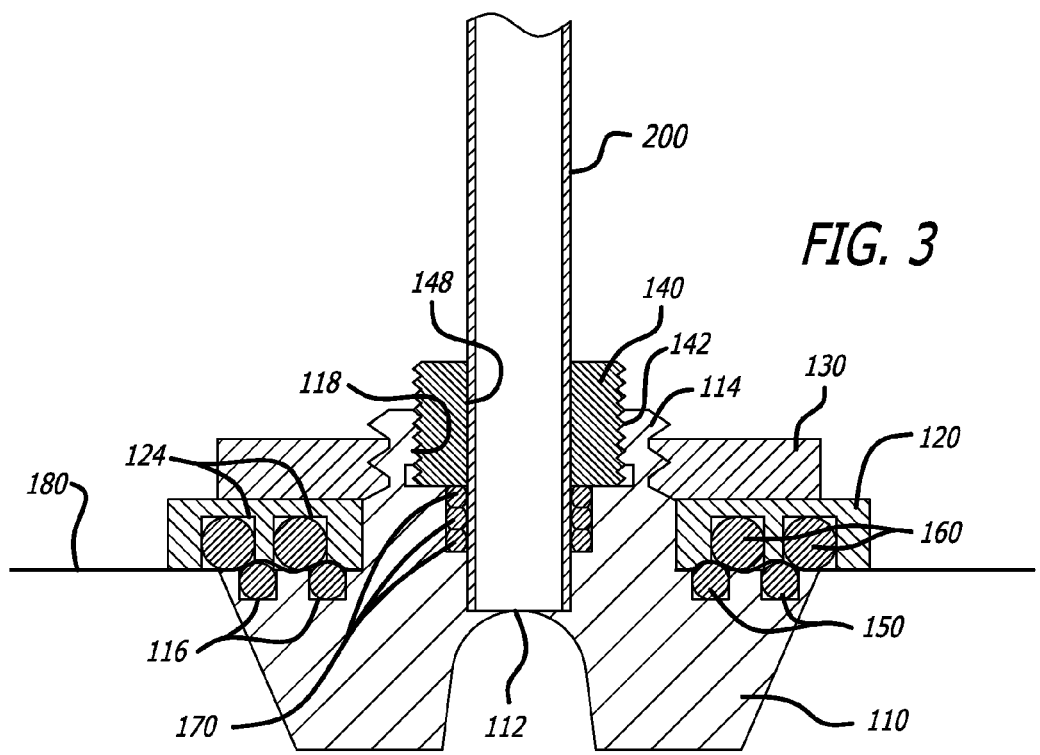
FIG. 3 is a cross-sectional view of a fitting for vacuum assisted resin transfer molding.

As seen in FIGS. 2-3, the sealing washer 120 is adapted to slip over the threaded exterior 114 and to engage the top of the base 110. The sealing washer side 122 is designed in such a way that it overhangs the top edge of the base 110. This ensures that hardening resin within a vacuum assisted resin transfer molding bag does not harden around the base, thereby making it difficult to remove. This will be discussed more fully below with respect to FIG. 2. The sealing washer 120 underside (shown in FIG. 2) includes one or more washer seals 160 that, in conjunction with the base seals 150 in the base 110, create a seal to maintain the fitting 100 within a port.

The sealing nut 130 is adapted to engage the threaded exterior 114 of the base 110 to thereby compress the underside of the sealing washer 120 into the upper portion of the base 110. As will be described more fully below, this creates a seal around a vacuum assisted resin transfer molding port into which the base 110 is inserted and the sealing washer 120 placed over.

The sealing nut 130 may include a series of apertures 132 or other designs that may be decorative or designed to reduce the total amount of material needed to manufacture the sealing nut 130. Alternatively, the sealing nut apertures 132 may also serve to ease tightening and loosening the sealing nut 130 by reducing the total area over which friction is generated on the upper surface of the sealing washer 120 when the sealing nut 130 is tightened.

The sealing nut 130 may include knurling on its exterior to enable an individual to hand-tighten the sealing nut 130 onto the external threading 114. Alternatively, and as will be seen, for example in FIG. 5 below, the sealing nut 130 may include a series of parallel elongated edges suitable for tightening using a wrench or ratchet.

Notably, the sealing nut 130 and the sealing washer 120 are distinct from one another because were the two elements combined, the port in the vacuum assisted resin transfer molding bag could be twisted and potentially torn or otherwise damaged as a combined sealing nut 130 and sealing washer 120 was turned to be tightened over the bag. The separation of the sealing nut 130 and sealing washer 120 ensures that a tight seal may be created over the port without damaging the bag as the sealing nut is tightened. Specifically, the sealing washer 120 can remain substantially in place as the sealing nut 130 is tightened to create the seal around the port.

The inner nut 140 includes external threading 142, elongated edges 144 for use with a wrench or ratchet, and extended threading 146 that matches the external threading 142, but when included along with the elongated edges 144 enables one to tighten the inner nut 140 into the threaded interior of the base 110. The inner nut 140 also includes an aperture 148 into which tubing 200 may be inserted.

The tubing 200 may be typical PVC (polyvinyl chloride) tubing, an acetal water fitting, or other forms of plastic tubing, or a rigid or semi-rigid polymer tubing. Preferably, the aperture 148 in the inner nut 140 will be adapted for use with the size and type of tubing 200 typically used in a given vacuum assisted resin transfer molding process.

FIG. 2 shows an exploded view of a fitting 100 for vacuum assisted resin transfer molding. The base 110, sealing washer 120, sealing nut 130, inner nut 140 are shown. Base seals 150, washer seals 160 and aperture seals 170, not visible in FIG. 1, are also shown.

The base 110 includes the saddle 112, the threaded exterior 114 and a series of channels 116. The threaded exterior 114 may be considered an upper portion of the base 110, whereas the lower portion of the base maybe considered the portion including the saddle 112 and the channels 116. These channels 116 are designed to accept one or more of the base seals 150.

The sealing washer 120 includes a sealing washer side 122 designed to overlap the lower portion of the base 110. The sealing washer 120 also includes a series of channels 124 designed to accept one or more washer seals 160. The term "seal" as used herein refers to a pliable material suitable for creating a seal between two surfaces. A rubber or silicone o-ring is one example of a "seal." The washer seals 160 form a seal in conjunction with the base seals 150 when the sealing washer 120 is placed on top of the lower portion of the base 110 thereby putting the base seals 150 in contact with the washer seals 160. As the sealing nut 130 is tightened, the washer seals 160 and base seals 150 compress together to form a seal with the bag about a port into which the fitting 100 is inserted.

The sealing nut 130 includes a plurality of apertures 132 which are described above.

The inner nut 140 includes external threading 142, elongated edges 144 for use with a wrench or ratchet, and extended threading 146 that matches the external threading 142, but when included along with the elongated edges 144 enables one to tighten the inner nut 140 into the threaded interior of the base 110. The inner nut 140 also includes an aperture 148 into which tubing 200 may be inserted.

One or more aperture seals 170 are also visible in FIG. 2. These aperture seals 170 are inserted into the aperture into which the inner nut 140 is inserted, prior to inserting the inner nut 140. The aperture seals 170 may be of variable pliability and react differently to varying levels of compression. For example, two of the three shown aperture seals 170 may compress easily, thus creating a seal with the tubing while the third seal may compress much less easily thereby aiding in compressing the other two aperture seals 170. As will be described more fully below, these aperture seals 170 are compressed by the inner nut 140 to thereby form a seal about the tubing 200 inserted into the aperture 148 in the inner nut 140.

Turning now to FIG. 3, a cross-sectional view of a fitting 100 for vacuum assisted resin transfer molding is shown. The base 110, saddle 112, outer threading 114, channels 116, inner threading 118 (visible in cross-section), sealing washer 120, channels 124, sealing nut 130, inner nut 140, external threading 142, aperture 148, base seals 150, washer seals 160, aperture seals 170, and tubing 200 are all as described with reference to FIGS. 1-2. FIG. 3 also includes a bag 180. While described as a bag 180, it may also be a silicon or vinyl mold or other mold type used in vacuum assisted resin transfer molding. Typical molds, especially for larger parts, are bags such as bag 180.

The base 110 includes the channels 116 described above. The base seals 150 sit within those channels 116.

Figure 4:
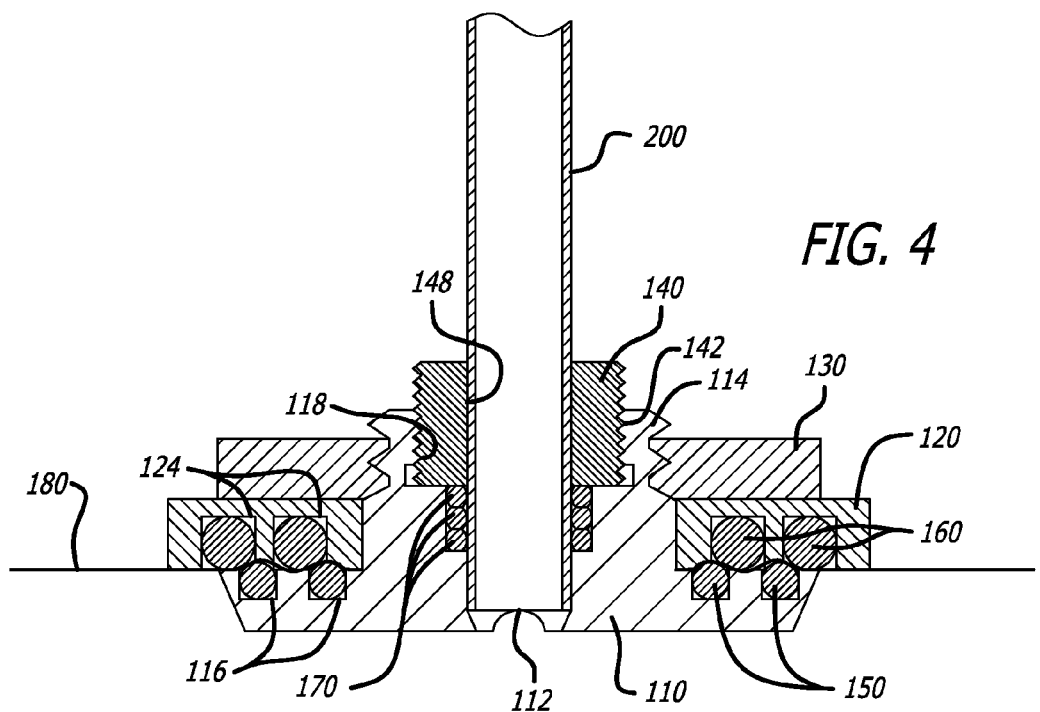
FIG. 4 is a cross-sectional view of an alternative fitting for vacuum assisted resin transfer molding.

The sealing washer 130 cross-section shows the washer seals 160 within the channels 124. Of note, in each case the base seals 150 are internal, relative to an axis extending through the middle of the tubing 200, to the washer seals 160. This enables the washer seals 160 and base seals 150 to create an adequate seal around the bag 180. More particularly, the vacuum bag 180 assumes a serpentine form between the seals 150, 160, which helps maintain the vacuum bag 180 in place and helps prevent it from shifting or pulling out from the device. Two sets of the base seals 150 and washer seals 160 are shown in FIGS. 3 and 4, but a single set or more than two sets may be included in the fitting 100. For instance, the seals can be repeated at a second level above or below the seals 150 and 160 in order to accommodate a second vacuum membrane (bag) for "double bagging." In such a case, multiple bases and multiple sealing washers may be employed along with multiple sealing nuts may be used. Multiple bags help to ensure that the vacuum is maintained throughout the process.

The sealing washer 130 extends beyond the base 110 in such a way that the outer of the two washer seals 160 shown abuts the outer, upper edge of the lower portion of the base 110. In this way, resin material that has hardened within the mold is certain to be larger than the aperture created by the fitting 100. As a result, removing the fitting 100 will not be difficult and will not damage the fitting 100 or the hardened resin as the fitting 100 once the molding process is complete.

Similarly, the base 110 slopes inward away from the tubing so that no edge or similar diameter opening exists for the hardened resin to grasp as the fitting 100 is removed. This aids in continued reuse of the fitting 100 and ensures that neither the fitting 100 nor the resulting hardened resin is damaged as the fitting 100 is removed.

The base 110 also includes a series of aperture seals 170 (three are shown) that surround the tubing 200 and are inserted into the base 110 below the inner nut 140. These aperture seals are selected so as to be compressible using the inner nut 140 as it is tightened to the base using the inner threading 118 engaging the external threading 148. As discussed above, these aperture seals 170 may be of variable pliability. As the inner nut 140 is tightened, the aperture seals 170 compress and expand into the outer circumference of the tubing 200 to thereby form multiple seals about the tubing 200. The tubing 200 is often not perfectly round and compressing the seals 170 around the tubing 200 forms a seal despite any irregularities. The compression of the seals 170 also helps to secure the tubing 200 in place and prevents movement of the tubing during the infusion of resin, which can cause undesirable air leaks, thus ruining the vacuum within the bag and hindering creation of the resin molded object. The seals 170 may comprise O-rings of different hardnesses, or durometers. In some embodiments, a relatively softer O-ring is placed between two harder O-rings. In other embodiments, all the O-rings have the same hardness. However, the tubing 200 itself passes through the fitting 100 into the bag 180 without any edge or joint between the tubing 200 and the fitting 100. In this way, the resin can pass unimpeded into the bag 180. In addition, as the resin hardens, there is no edge of the tubing or any joint in the fitting 100 for the resin to harden over. As a result, the fitting 100 may be easily removed once the resin is hardened.

Because of all of the foregoing, the fitting 100 may be easily removed from a port once a vacuum assisted resin transfer molding process is complete. The fitting 100 may be reused many times. Early tests indicate that the fitting 100 may be used in excess of fifty times without damage to the fitting 100 and without damage (caused by the fitting 100 or removal of the fitting 100) to the bag 180, mold or the resulting hardened resin. As a result, the fitting 100 may be made of a metal or rigid plastic material suitable for reuse many times. Prior art fittings and methods generally result in destruction of the fitting and replacement of the fitting after each use. As a result, fittings of the prior art are often made of less substantial materials.

FIG. 4 shows a cross-sectional view of an alternative fitting 100 for vacuum assisted resin transfer molding. Each of the elements shown in FIG. 4 is visible and described above with reference to FIGS. 1-3. The base 110 of FIG. 4 is reduced in depth and the saddle 112 is similarly reduced. This fitting 100 with reduced saddle 112 and base 110 depth is for use with smaller feed lines, such as the Enka-Channel by Colbond, Inc., with no feed lines whatsoever.

Figure 5:
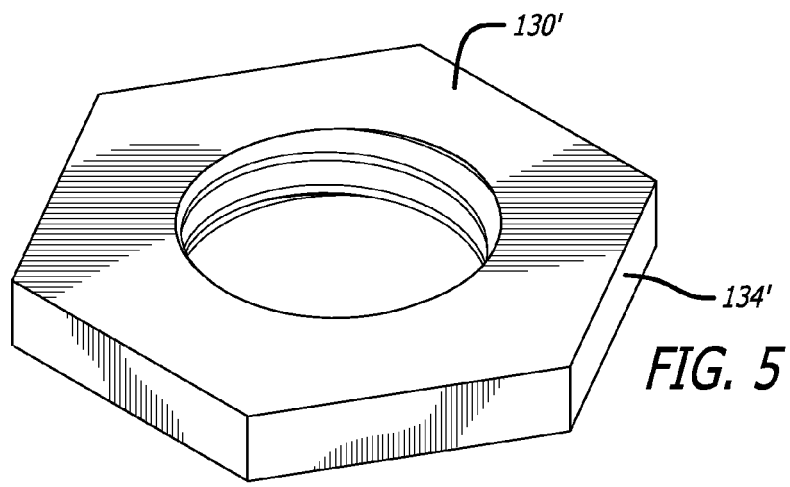
FIG. 5 is an alternative nut for a fitting for vacuum assisted resin transfer molding.

FIG. 5 is an alternative sealing nut 130' for a fitting for vacuum assisted resin transfer molding. The edges 134' of this sealing nut 130' are elongated for use with a wrench or ratchet in tightening the sealing nut 130' over the sealing washer 120 to the base 110. Other forms of the sealing nut 130' are also possible.

Figure 6:
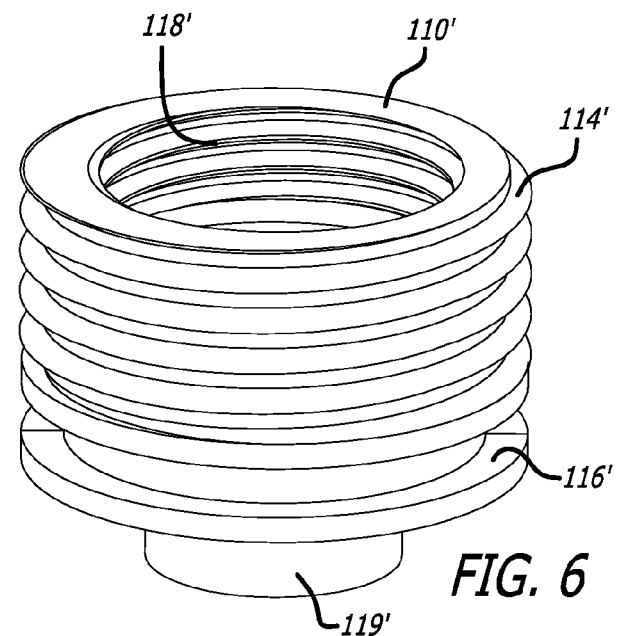
FIG. 6 is an alternative base for a fitting for vacuum assisted resin transfer molding.

FIG. 6 is an alternative base 110' for a fitting for vacuum assisted resin transfer molding. The base 110' is designed to be a permanent or semi-permanent part of a hard or semi-hard VARTM tool or other form. The base 110' includes external threads 114' and internal threads 118'. The base 110' also includes a tubular extension through which resin may be injected into a bag or mold.

In place of a series of seals and channels, the base includes a bag fitting channel 116'. The base 110' may be pressed into the bag or may be held in place in the bag fitting channel 116' via welding or adhesives such as epoxy, urethane or methyl methacralate. Alternatively, the bag or form may incorporate a fiberglass laminate or other rigid or semi-rigid material that is adapted to incorporate the base 110' and to hold it within the bag or mold. An inner nut 140 may be used in conjunction with such a base 110' as described above.

Figure 7:
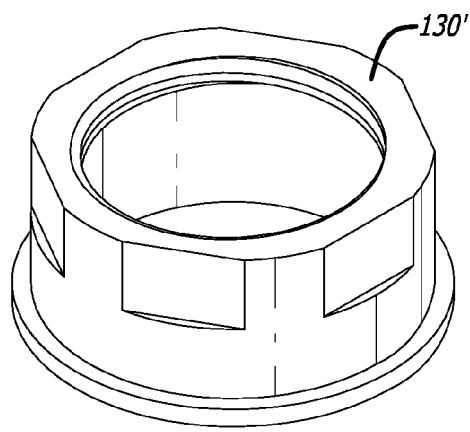
FIG. 7 is an alternative nut for a fitting for vacuum assisted resin transfer molding.

FIG. 7 is an alternative sealing nut 130' for a fitting for vacuum assisted resin transfer molding. This sealing nut 130' may be used in conjunction with the base 110' described above. The sealing nut 130' may be used to set the depth which the tubular extension 119' extends into the bag or form. As the sealing nut 130' is further tightened, the tubular extension 119' is pulled further outwards away from the bag or form.

Figure 8:
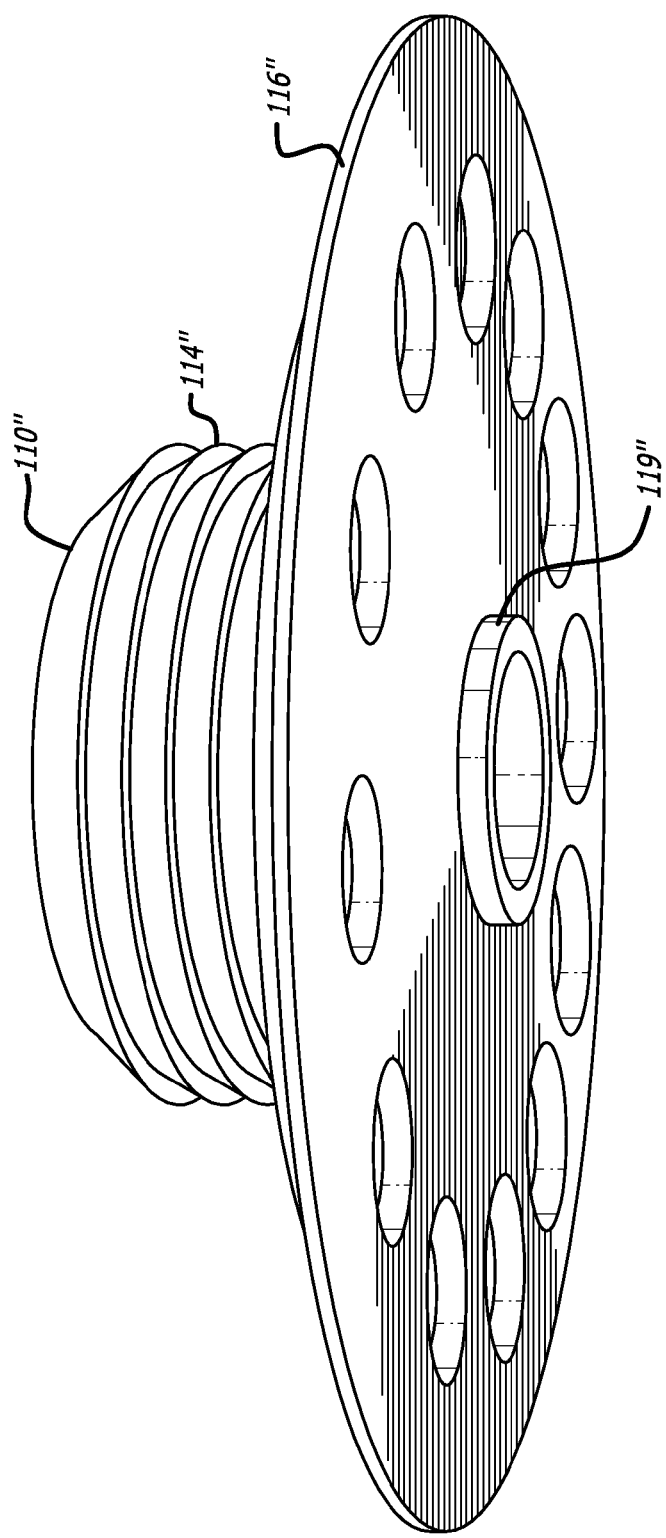
FIG. 8 is an alternative base for a fitting for vacuum assisted resin transfer molding.

FIG. 8 shows an alternative base 110" for a fitting for vacuum assisted resin transfer molding. The base 110" includes external threads 114". In place of the channels 116 or the bag fitting channel 116', the base 110" includes a rigid or semi-rigid flange 116" for use in maintaining the base 110" within a reusable "soft mold" such as a natural rubber mold or a silicone mold. The flange 116" may be the same material as the base 110" which may be made up of a single piece of material or may be an addition to the base 110" made of a different material. The tubular extension 119" serves the same function as that in FIG. 9.

Description of Processes

Figure 9:
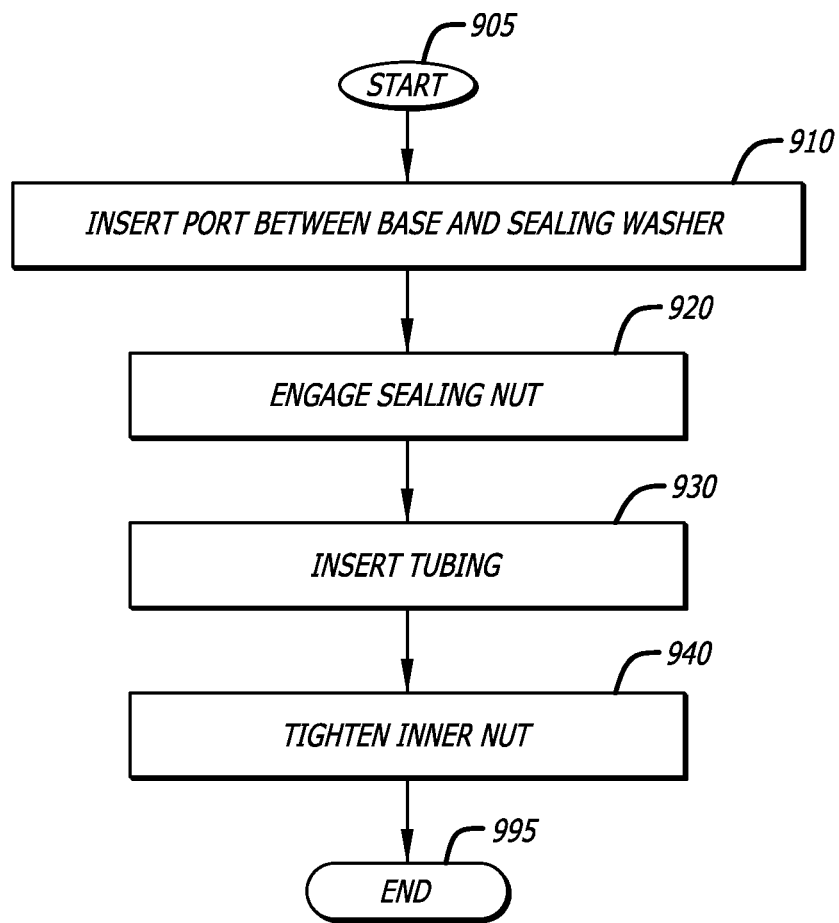
FIG. 9 is a flowchart of a method of using a fitting for vacuum assisted resin transfer molding.

Referring now to FIG. 9, a method of using a fitting for vacuum assisted resin transfer molding is shown. The flow chart has both a start 905 and an end 995, but the process may be cyclical in nature. In addition, many instances of the method may take place serially or simultaneously.

As a first step, the fitting 100 is placed within the port by inserting the port between the base 110 and the sealing washer 120 at 910. As described above, a port is an entryway for resin to enter a bag or other form. By placing the base 110 below and the sealing washer 120 above the port, the base seals 150 and the washer seals 160 to come in contact with the edges of the port to begin the process of forming a seal about the port for the fitting 100 on the bag or other form.

Next, the sealing nut 130 is engaged over the sealing washer 120 and with the base 110 at 920. As the sealing nut 130 is tightened, the base seals 150 and washer seals 160 engage the port and the fitting 100 is thus is held in place relative to the port. The base seals 150 and washer seals 160 create an airtight seal around the port so that no air may enter the vacuum within the bag and so that no resin may escape during infusion. The use of the sealing washer 120 ensures that the port or bag is not damaged by the process of tightening the sealing nut 130, because, as described above, the sealing washer remains still, while the sealing nut 130 is turned for tightening.

Next, the tubing 200 is inserted through the inner nut 140 and through the base 110. A user may select a desired depth for the tubing 200 to penetrate the bag or mold or to enter into any feed lines or internal hoses.

Once the depth is selected, the user may tighten the inner nut 140 at 940. During this process, the aperture seals 170 are engaged by the inner nut 140 as it compresses them and causes the aperture seals 170 to engage the exterior of the inserted tubing 200 and to thereby create one or more seals about the tubing 200. Again, this ensures that the vacuum is maintained within the bag or form and that no resin escapes through the fitting 100.

Once the inner nut 140 and the sealing nut 130 are tightened to a desired torque, the fitting 100 is ready for use.

Though process steps 920-940 are shown in a particular order, the order may be altered such that the tubing 200 is inserted before or simultaneously with the engagement of the sealing washer 120 and base 110 without substantially altering the overall process.

The fitting 100 may be removed without damaging the fitting 100 or the bag by reversing the procedure.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A fitting for vacuum assisted resin transfer molding comprising:
   a base including a central aperture passing through the base and surrounded by at least one aperture seal for engaging tubing inserted into the central aperture, a lower portion having two upward-facing base seals, and an upper portion including a threaded exterior and a threaded interior;
   a sealing washer, including two washer seals, adapted for abutting the lower portion of the base such that the inner edge of the two washer seals abut the outer edge of the two base seals;
   a sealing nut adapted to abut the sealing washer and to engage the threaded exterior of the upper portion to thereby cause the two washer seals to engage the two base seals to thereby form a seal about a vacuum bag; and
   an inner nut, including a nut aperture adapted to allow tubing to pass through, adapted to engage the threaded interior of the upper portion and to thereby cause the at least one aperture seal to compress and to form a seal about tubing as the inner nut is tightened.

2. The fitting of claim 1 wherein the at least one aperture seal is maintained within the aperture by a retainer against which the inner nut compresses the aperture seal to aid in forming the seal about tubing as the inner nut is tightened.

3. The fitting of claim 1 wherein the base includes a saddle suitable for use with an interior flow channel.

4. The fitting of claim 1 wherein threads of the threaded exterior are right handed and those of the threaded interior are left handed.

5. The fitting of claim 1 wherein one aperture seal of the at least one aperture seal has a greater elasticity than another aperture seal such that the one aperture seal easily compresses.

6. The fitting of claim 1 wherein the at least one aperture seal and the two base seals and the two washer seals are replaceable.

7. The fitting of claim 1 wherein the central aperture and the nut aperture are composed of a rigid material for guiding the tubing.

8. The fitting of claim 1 wherein, when compressed using the sealing nut, the inside of the outer of the two washer seals abuts the outside of the outer of the two base seals and further where the inner of the two washer seals abuts the outside of the inner of the two base seals.

9. The fitting of claim 8 wherein a port in a vacuum membrane is disposed between the sealing washer and the base.

10. The fitting of claim 1 wherein a port in a vacuum membrane is disposed between the sealing washer and the base.

11. The fitting of claim 1 wherein the fitting is composed of rigid material suitable for reuse.

12. The fitting of claim 11 wherein the material for the base, sealing washer, sealing nut and inner nut is one of a metal and a rigid plastic.

13. The fitting of claim 11 wherein the fitting is reusable more than fifty times.

14. The fitting of claim 1 wherein the two washer seals overlap the exterior of the base.

15. The fitting of claim 14 wherein the two washer seals are disposed relative to the base such that any infused material hardening below the base after use of the fitting cannot form over the base to thereby impede removal of the fitting from the material.

16. The fitting of claim 14 wherein the edge of the base slopes inward away from the two washer seals to aid in removal of the fitting after use.

17. The fitting of claim 1 wherein the inner nut comprises and upper nut portion and a lower nut portion and further wherein the upper nut portion includes edges that may be tightened with a wrench and wherein corners of those edges incorporate threading matching the exterior threading of the lower nut portion.

18. A method of using the fitting for vacuum assisted resin transfer molding of claim 1 comprising:
   inserting a port between the base and the sealing washer;
   engaging the sealing nut to thereby cause the two washer seals to engage the two base seals to thereby form a seal about a vacuum bag;
   inserting tubing through an aperture in the inner nut; and
   tightening the inner nut to thereby cause the at least one aperture seal to compress and to form a seal about the tubing.

19. The fitting of claim 1 wherein threads of the threaded exterior are left handed and those of the threaded interior are right handed.

20. A fitting for vacuum assisted resin transfer molding comprising:
   a base including a central aperture passing through the base and surrounded by three aperture seals, a lower portion having an inner and an outer upward-facing base seal, and an upper portion including a threaded exterior and a threaded interior;
   a sealing washer including an inner and an outer downward-facing washer seal, the sealing washer adapted for abutting the lower portion of the base such that the inner edges of the inner and outer washer seals abut the outer edges of the inner and outer base seals;
   a sealing nut adapted to abut the sealing washer and to engage the threaded exterior of the upper portion to thereby cause the inner and outer washer seals to engage the inner and outer base seals and to thereby form a seal about a vacuum bag; and an inner nut, including a nut aperture adapted to allow tubing to pass through, adapted to engage the threaded interior of the upper portion and to thereby cause the aperture seals to compress and to form a seal about tubing as the inner nut is tightened.

\* \* \* \* \*